March 23, 1926.
J. TAYLOR
BATTERY CARRIER
Filed July 20, 1925
1,578,105
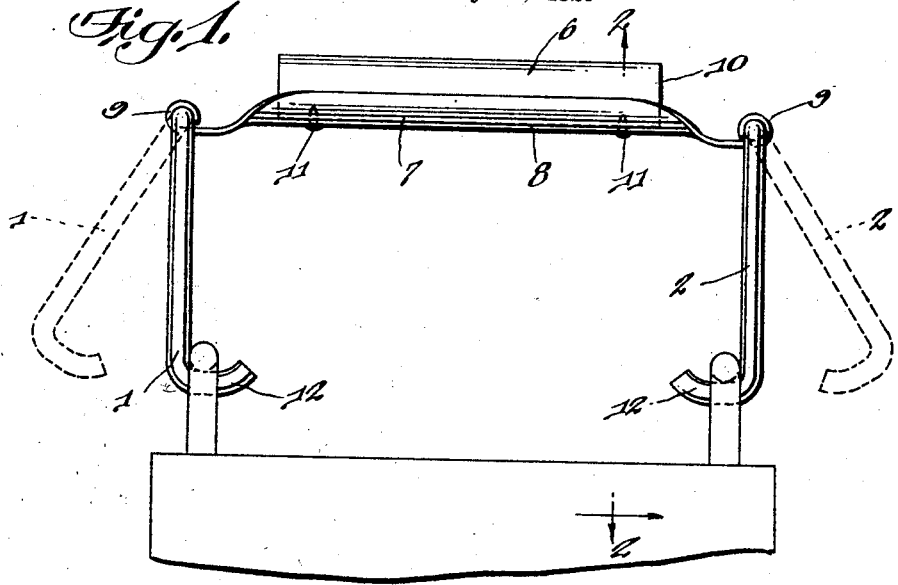
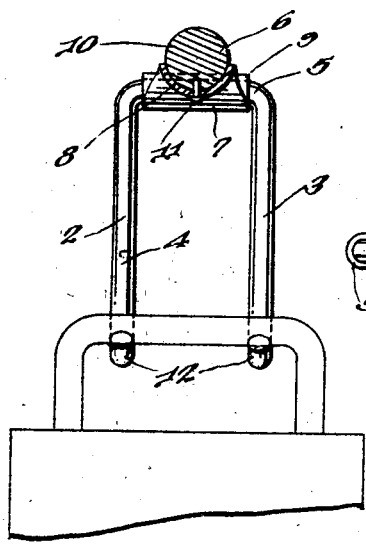
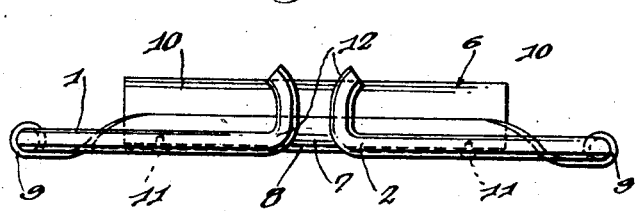
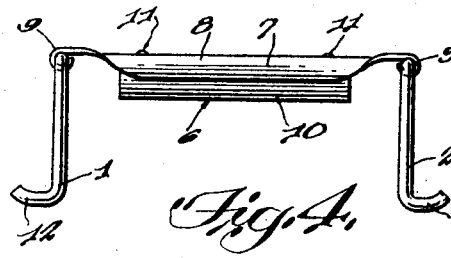
John Taylor
INVENTOR
BY Victor J. Evans
ATTORNEY Patented Mar. 23, 1926.

1,578,105

UNITED STATES PATENT OFFICE.

JOHN TAYLOR, OF CHICAGO, ILLINOIS, ASSIGNOR TO THE BATTERY EQUIPMENT AND SUPPLY COMPANY, OF CHICAGO, ILLINOIS, A CORPORATION OF ILLINOIS.

BATTERY CARRIER.

Application filed July 20, 1925. Serial No. 44,937.

*To all whom it may concern:*

Be it known that I, JOHN TAYLOR, a citizen of the United States, residing at 1640 S. Wabash Ave., Chicago, in the county of Cook and State of Illinois, have invented new and useful Improvements in Battery Carriers, of which the following is a specification.

This invention relates to a battery carrier and has for its primary object the construction of a carrier wherein the battery engaging hooks may have their positions reversed.

An object of the invention is the construction of a battery carrier of inexpensive design having a handle so designed that the same may be conveniently gripped irrespective of the position of the hooks.

Besides the above my invention is distinguished in the compact manner in which the carrier may be folded.

With these and other objects in view, the invention will be better understood from the following description taken in connection with the accompanying drawings.

Fig. 1 is a side elevation of my improved carrier in applied position.

Fig. 2 is a sectional view on the line 2—2 of Fig. 1.

Fig. 3 is a side elevation showing the carrier folded.

Fig. 4 is a side elevation of the carrier in a reversed position.

Again referring to the drawings illustrating one of the many constructions of my invention, the numerals 1 and 2 designate a pair of hooks, each of U-shaped formation with the limbs 3 and 4 parallel with each other and connected by the yoke 5. The handle 6 comprises a plate 7 having a curved body portion 8 and its ends formed into ears 9 engaging the yoke 5 of the hook. Arranged in the curved body portion 8 is a filler 10 preferably made from wood and held in place by the nails 11. It will be noted that the bills 12 of the hooks are so shaped and disposed that the position of the hooks may be reversed as shown in Fig. 4 and effectively brought into engagement with the battery from the inside thereof. In practice it is advantageous to have the hooks disposed as shown in Fig. 4 to engage the battery from the inside.

It will be noted that the design of the handle is such that irrespective of the position of the hooks the hand may grip the handle in a very convenient manner. It will also be noted that the filler 10 besides providing a curved surface for the fingers when the hooks are in position as shown in Fig. 4, strengthens the plate 7 at its weakest point. It will also be noted that the distance between the limbs 3 and 4 is such as to allow the hooks to fold into a very compact arrangement as shown in Fig. 3.

Of course, it is to be understood that the parts may be designed in other ways than illustrated and associated in other relations and therefore I do not desire to be limited in any manner except as set forth in the claim hereunto appended.

Having thus described my invention, what I claim is:

A battery carrier comprising a pair of U-shaped hooks and a handle connecting the hooks consisting of a connecting plate having a curved body portion and its ends formed into ears receiving the yoke portions of the hook and a cylindrical filler secured to and received in the curved body portion of said plate.

In testimony whereof I affix my signature.

JOHN TAYLOR.